Dec. 25, 1934.  V. JERECZEK  1,985,861
THREAD SPINDLE GEARING
Filed May 9, 1934
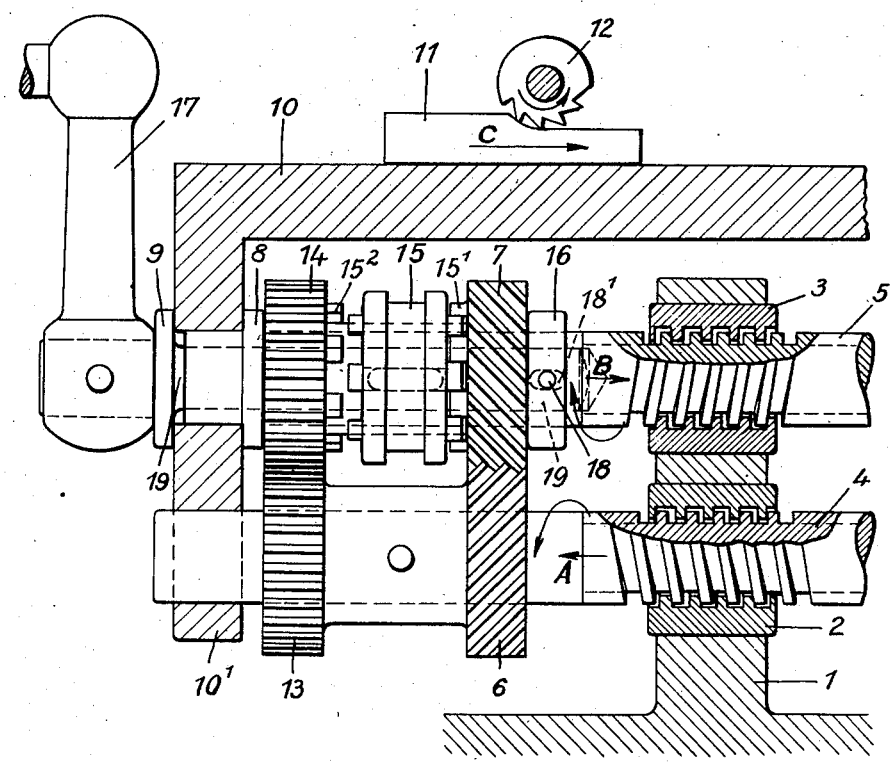
Inventor
Viktor Jereczek
by: Marks & Clark
Attorneys.

UNITED STATES PATENT OFFICE 1,985,861

THREAD SPINDLE GEARING

Viktor Jereczek, Tempelhof, near Berlin, Germany

Application May 9, 1934, Serial No. 724,785
In Germany March 2, 1932

7 Claims. (Cl. 74—441)

With thread spindle gearings used for driving purposes of any kind, for instance in connection with machine tools, the backlash constitutes during the operation of the respective machine a detrimental action and can give rise to serious difficulties. The object of the present invention is to obviate such consequences.

This is attained by means of a device specially designed for the purpose in view and comprising essentially two gearings, each of which comprises in turn a threaded spindle and a nut, and of which gearings the spindle or the nut of one thereof is being driven and one of said gearing members is freely axially shiftable with respect to the other gearing member, independently of the machine part to be moved, whereas the spindle or the nut of the other gearing, which members are either unable to be moved independently of the machine part to be moved or can make only slight independent movements, are driven by the first-mentioned gearing by the intermediary of helical-wheels having a toothed spiral up to 60°, so as to render possible bringing the threads of the spindles and the nuts of both gearings into clearance-free mesh by axial shifting.

It is suited to the purpose in view to design the arrangement and combination of the parts concerned in this way that of two threaded spindles the one which is axially supported only in its nut but is otherwise freely axially shiftable is being driven, whereas the other threaded spindle which is movable in its nut and axially unshiftably connected with the machine part to be moved is driven by the first-mentioned spindle by the intermediary of helical wheels having a toothed spiral up to 60°. In this constructional form the two spindle nuts may be firmly connected with one another. Owing to the axial pressure arising when the first-mentioned spindle is being driven, and being due to the toothed spiral, the two threaded spindles are shifted in opposite directions until the thread flanks of both spindles which lie counter to one another contact with their nuts whereby the backlash is done away with.

It is, furthermore, suited to the purpose to incline the toothed spirals of the worm-wheels in such a direction and only so much that said wheels are possibly much relieved from the working load. This is very well possible especially in those cases in which the machine parts connected with the device constituting the present invention are not solely to be moved by this device, but in which this latter is intended to serve chiefly for stopping an existing force and regulating the extent of the motion caused by that force. That may take place, for instance, with milling machines in which the direction of rotation of the milling cutter is the same as the direction of feed of the work-piece.

In the detailing part of this specification I have described the invention in connection with such a milling machine, more precisely with such a constructional form of the same in which the threaded spindles can be axially shifted.

As regards special purposes likewise dealt with in this specification it is advantageous to suspend temporarily the axial shifting of the threaded spindles. In order to attain this said spindles are connected with one another not only by the worm-wheels, but by spur-wheels, too, the arrangement being such that both kinds of wheels are coupled alternately with the threaded spindles in such a manner that either only the helical wheels or the spur wheels transmit the power from the one spindle to the other.

The invention is illustrated diagrammatically and by way of example on the accompanying drawing which shows it partly in front-view and partly in vertical section and designed as feed device for a milling machine. On the drawing, the part denoted 1 may be the carriage (tool carriage, tool rest) of the machine or the bed of the same, and 2 and 3 are nuts which are firmly secured in said part 1. In the nut 2 rests the threaded spindle 4 and in the nut 3 the threaded spindle 5. The two spindles may be coupled with one another by the helical wheels 6 and 7, as well as by the spur-wheels 13 and 14. The helical-wheel 6 and the spur-wheel 13 are affixed to the spindle 4, but the helical-wheel 7 and the spur-wheel 14 are loosely supported on the spindle 5 and can be singly coupled with the same with the aid of a double-sided coupling sleeve 15 which is shiftable upon said spindle, but not turnable thereon. The wheels 7 and 14 have suitably designed and located coupling lugs $15^1$ and $15^2$ respectively. 16 is a collar which is located on the spindle 5 and can hold together the members 7, 14 and 15.

The arrangement of the various wheels can be the reverse of the arrangement shown in the figure, in this way, that the loose wheels and the coupling sleeve are located upon the spindle 4, and furthermore, each spindle may be provided with a sleeve like 15.

The toothed spirals of the helical wheels 6 and 7 have an inclination of 45°, but the degree may be considerably lower or considerably higher, according to the special object of the respective constructural form, or to the machine tool etc. with which the device is combined.

The spindle 5 is retained in proper position in the table 10 of the milling machine by means of collars 8 and 9 which prevent any axial displacement of said spindle and do not allow any axial play. The table 10 is guided on a bed in the usual manner. In order to provide for proper meshing of the wheels 6 and 7, also the spindle 4 may be supported in the table 10, but must be axially shiftable to the requisite extent.

If the helical-wheels 6 and 7 mesh directly with one another, the threads of the spindles 4 and 5 must run in opposite directions. If the ratio between said wheels 6 and 7 is 1:1, the threads of the spindles must have the same pitch and inclination. If, however, the ratio between the wheels 6 and 7 is otherwise than 1:1, also the direction and the inclination of the threads of the spindles must be correspondingly otherwise, and also the spur-wheels 13 and 14 must correspond with the wheels 6 and 7 as regards their ratio and their direction of rotation.

11 denotes a work-piece which is being milled by the milling-cutter 12. Supposing, the spindle 4 be rotated by any suitable source of power or by means of any suitable gearing in the direction indicated by the downwardly pointing arrow, it being presupposed that the helical-wheel 7 is coupled with the threaded spindle 5 by the coupling 15 and that there is backlash in the threads, the inclined flanks of the wheels 6 and 7 slide along each other and thereby shift the spindle 4 axially to the left (arrow A) and the spindle 5 axially to the right (arrow B) until the left-hand flanks of the spindle 4 and the right-hand flanks of the spindle 5 contact with the threads in the nuts 2 and 3. In order to show this more distinctly in the drawing I have drawn the profile of the threads in the nuts to a somewhat enlarged scale.

Only when the thread flanks of both spindles, 4 and 5, contact on opposite sides with the thread flanks in the nuts and now no further shifting of the spindles can take place, the helical-wheel 7 will be rotated by the helical-wheel 6 whereby the milling table will be shifted in right-hand direction.

The backlash is, thus, done away with by the axial action of the helical wheels 6 and 7, as now the right-hand flanks of the wheel 6 contact with the left-hand flanks of the wheel 7, the left-hand flanks of the thread of the spindle 4 contact with the right-hand flanks in the thread of the nut 2, and the right-hand flanks of the thread of the spindle 5 contact with the left-hand flanks of the thread in the nut 3.

When the table 10 is shifted to the right, the entire working pressure is being taken up by the teeth of the helical-wheels 6 and 7 until the milling cutter 12 has not yet commenced to act upon the work-piece 11. But as soon as this takes place, the milling table 10 is drawn by the cutter 12 to the right, as indicated by the arrow C, the entire working pressure or load being now taken up by the right-hand flanks of the thread of the spindle 5. By the rotation of the helical-wheel 7 and the spindle 5, as caused by the helical-wheel 6, solely the extent of the shifting of the table 10 is regulated which requires only little power and subjects the wheels 6 and 7 hardly to any strain.

When then the table 10 is again to be moved to the left, the spindle 4 must be turned in the opposite direction. It is now running without load until the flanks of the wheels 6 and 7 and of the spindles 4 and 5, between which there exists backlash at the time being, again contact with one another, when now the return-movement of the table will commence. But as can be guessed from what has already been explained, the threaded spindle 5 must, while the table commences its rearward movement, also be turned without load until the flanks of the wheels 6 and 7 and of the spindles 4 and 5, where up to then backlash had existed, contact with one another, as will now be clear without further detailed explanations.

But while that takes place, the working table 10 is not prevented from shifting in the direction of the milling action of the tool, and it might, therefore, occur that the milling tool takes hold of the work piece and draws it along with it together with the table whereby fractures might be entailed. Such a detrimental consequence is rendered impossible, owing to the present invention, by the feature that not the spindle 4, but the spindle 5 is turned rearwardly which may be effected by means of the handle 17 or by any suitable mechanical contrivance.

As has already been described, the working pressure of the cutter 12 during running with cut is taken up without any clearance by the spindle 5. If now, in order to move the table 10 rearwardly, said spindle is rotated in opposite direction, the thread flanks already contacting with one another effect that return movement of the table, so that, in fact, the play-free taking-up of the power-action of the cutter is not interrupted at all and, therefore, taking hold of the work-piece by the cutter is reliably prevented.

There is now no axial shifting of the spindles 4 and 5 by the helical-wheels 6 and 7 requisite, and it is, therefore, practical to uncouple the helical-wheel 7 from the spindle 5 prior to turning this spindle in the opposite direction and to couple the spindle 5 with the spur-wheel 14 so that now solely the spur-wheels 13 and 14 transmit the power from the one spindle to the other and no axial shifting of the same can take place.

If the milling work to be done is of that kind in which the direction of rotation of the cutter and the feeding direction of the table are counter to one another, it is not requisite to remove the dead play. The helical-wheels 6 and 7 may then be continually uncoupled.

The axial shifting of the spindles 4 and 5 by means of the wheels 6 and 7 could be done away with, if requisite even without the spur-wheels 13 and 14, by blocking the free axial shiftability of the threaded spindle 4, that is to say, by connecting it unshiftably with the milling table to be moved. This can be effected in any desired manner, from which reason I have abstained from showing and describing it expressly.

The axial action of the helical-wheels 6 and 7 can be employed, according to this invention, also for removing the axial play between the threaded spindle and the machine part to be moved. For this purpose the collar 9 is, for instance, attached to a bolt 19 shiftable in a bore provided in the spindle 5, extending therein to the collar 16 and being connected with the same by means of a pin 18 passing through an oblong hole $18^1$ in the spindle 5, as shown. In this manner the axial action to which the helical-wheel 7 is subjected is transmitted to the collar 9, whereby this collar is pressed against the supporting arm $10^1$ of the milling table 10 so that any axial play existing between the spindle 5 and said table is removed.

In the constructional form shown and described by way of example the threaded spindles 4 and 5 are reciprocated together with the table 10, instead of which, however, any other part or member of a machine or device might be used, whereas the nuts 2 and 3 are stationary. But I wish it to be understood that I do not limit myself to this constructional form, in that it is as well possible to reciprocate the nuts together with the respective part or member of the respective machine or device, or to make the table or its equivalent and the spindles stationary and the nuts axially movable, or to move partly the nuts and partly the other members. Finally, I wish it to be understood that the invention is not limited to being employed in connection solely with milling machines; it may be employed in connection with any other machine or device where it can be utilized.

I claim:

1. A device for obviating backlash in thread spindle gearings serving for moving a machine part or the like, comprising, in combination, two gearings, each thereof comprising, in turn, a threaded spindle and a nut thereon, one of these two members of one of said gearings being driven and one of these two members being freely axially shiftable with respect to the other member, independently of the machine part to be moved, and one of the members of the other of said two gearings being so supported as to be not shiftable relatively to the machine part to be moved, and helical-wheels with toothed spirals having an inclination at the highest of 60° and meshing with one another, the first-mentioned gearing driving the other gearing by means of said helical-wheels, and said toothed spirals adapted to cause play-free engagement of the said spindles and nuts by axial shifting.

2. A device for obviating backlash in thread spindle gearings serving for moving a machine part or the like, comprising in combination, two gearings, each thereof comprising, in turn, a threaded spindle and a nut thereon, the nuts of said two gearings being stationary and not turnable, the threaded spindle of one of said gearings being driven and supported in its appertaining nut and adapted to be shifted axially, the threaded spindle of the second said gearing being unshiftably connected with the machine part to be moved, a helical-wheel on each of said two threaded spindles, said helical-wheels meshing with one another and having toothed spirals with an inclination at the highest of 60°, said toothed spirals adapted to cause play-free engagement of the said spindles and nuts by axial shifting.

3. A device for obviating backlash in thread spindle gearings serving for moving a machine part or the like, comprising, in combination, two gearings, each thereof comprising in turn, a threaded spindle and a nut thereon, one of these two members of one of said gearings being driven and one of these two members being freely axially shiftable with respect to the other member, independently of the machine part to be moved, and one of the members of the other of said two gearings being so supported as to be not shiftable relatively to the machine part to be moved, and helical-wheels with toothed spirals having an inclination at the highest of 60° and meshing with one another, the first-mentioned gearing driving the other gearing by means of said helical-wheels, and said toothed spirals adapted to cause play-free engagement of the said spindles and nuts by axial shifting, and couplings to engage and disengage the said helical-wheels with the respective parts of said two gearings.

4. A device for obviating backlash in thread spindle gearings serving for moving a machine part or the like, comprising, in combination, two gearings, each thereof comprising, in turn, a threaded spindle and a nut thereon, the nuts of said two gearings being stationary and not turnable, the threaded spindle of one of said gearings being driven and supported in its appertaining nut and adapted to be shifted axially, the threaded spindle of the second said gearing being unshiftably connected with the machine part to be moved, a helical-wheel on each of said two threaded spindles, one of said two helical-wheels being loosely turnable on the respective threaded spindle, and a coupling to connect said loosely turnable helical-wheel to said spindle, said two helical-wheels meshing with one another and having toothed spirals with an inclination at the highest of 60°, said toothed spirals adapted to cause play-free engagement of the said spindles and nuts by axial shifting.

5. A device for obviating backlash in thread spindle gearings serving for moving a machine part or the like, comprising, in combination, two gearings, each thereof comprising, in turn, a threaded spindle and a nut thereon, one of these two members of one of said gearings being driven and one of these two members being freely axially shiftable with respect to the other member, independently of the machine part to be moved, and one of the members of the other of said two gearings being so supported as to be not shiftable relatively to the machine part to be moved, and helical-wheels with toothed spirals having an inclination at the highest of 60° and meshing with one another, the first-mentioned gearing driving the other gearing by means of said helical-wheels, and said toothed spirals adapted to cause play-free engagement of the said spindles and nuts by axial shifting, spur-wheels adapted to transmit power from the first-mentioned gearing to the other gearing, and couplings to engage either the said helical-wheels or the said spur-wheels for power transmission.

6. A device for obviating backlash in thread spindle gearings serving for moving a machine part or the like, comprising, in combination, two gearings, each thereof comprising, in turn, a threaded spindle and a nut thereon, one of these two members of one of said gearings being driven and one of these two members being freely axially shiftable with respect to the other member independently of the machine part to be moved, and one of the members of the other of said two gearings being so supported as to be not shiftable relatively to the machine part to be moved, and helical-wheels with toothed spirals having an inclination at the highest of 60° and meshing with one another, the first-mentioned gearing driving the other gearing by means of said helical-wheels, and said toothed spirals adapted to cause play-free engagement of the said spindles and nuts by axial shifting and means to firmly connect the axially shiftable driven member to the machine part to be moved, substantially and for the purpose set forth.

7. A device for obviating backlash in thread spindle gearings serving for moving a machine part or the like, comprising, in combination, two gearings, each thereof comprising, in turn, a threaded spindle and a nut thereon, the nuts of said two gearings being stationary and not turnable, the threaded spindle of one of said gearings being driven and supported in its appertaining nut and adapted to be shifted axially, the threaded spindle of the second said gearing being unshiftably connected with the machine part to be moved, a helical-wheel on each of said two threaded spindles, one of said two helical-wheels being loosely turnable on the respective threaded spindle, and a coupling to connect said loosely turnable helical-wheel to said spindle, said two helical-wheels meshing with one another and having toothed spirals with an inclination at the highest of 60°, said toothed spirals adapted to cause play-free engagement of the said spindles and nuts by axial shifting, an abutment collar for said loosely turnable helical-wheel, a bolt movably arranged in a longitudinal hole of the threaded spindle carrying said loosely turnable helical-wheel, a pin connecting said bolt with said abutment collar, said bolt adapted to connect the said threaded spindle to the machine part to be moved, substantially as and for the purpose set forth.

VIKTOR JERECZEK.